(12) United States Patent
Lin

(10) Patent No.: US 10,717,376 B2
(45) Date of Patent: Jul. 21, 2020

(54) ADJUSTMENT SYSTEM AND METHOD THEREOF BETWEEN A CHILD CAR SAFETY SEAT AND A BACKREST

(71) Applicant: Shanghai Woyoo Electronic Technology Co., Ltd., Shanghai (CN)

(72) Inventor: Hao Lin, Shanghai (CN)

(73) Assignee: Suzhou Yi Quan Electronic Technology Co., Ltd., Changshu (CN)

( * ) Notice: Subject to any disclaimer, the term of this patent is extended or adjusted under 35 U.S.C. 154(b) by 28 days.

(21) Appl. No.: 16/301,239

(22) PCT Filed: Apr. 7, 2017

(86) PCT No.: PCT/CN2017/079694
§ 371 (c)(1),
(2) Date: Nov. 13, 2018

(87) PCT Pub. No.: WO2018/126549
PCT Pub. Date: Jul. 12, 2018

(65) Prior Publication Data
US 2019/0160980 A1 May 30, 2019

(30) Foreign Application Priority Data
Jan. 6, 2017 (CN) .......................... 2017 1 0010890

(51) Int. Cl.
*B60N 2/28* (2006.01)
*B60N 2/02* (2006.01)

(52) U.S. Cl.
CPC ......... *B60N 2/2878* (2013.01); *B60N 2/0232* (2013.01); *B60N 2/0244* (2013.01); *B60N 2/2893* (2013.01); *B60N 2002/0236* (2013.01); *B60N 2002/0272* (2013.01)

(58) Field of Classification Search
CPC ...... B60N 2/2878; B60N 2/2893; B60N 2/28; B60N 2/0232; B60N 2/0244; B60N 2002/0236; B60N 2002/0272
USPC ......................................................... 297/253
See application file for complete search history.

(56) References Cited

U.S. PATENT DOCUMENTS

| | | | |
|---|---|---|---|
| 8,044,782 B2 * | 10/2011 | Saban | B60N 2/002 340/438 |
| 9,969,306 B1 * | 5/2018 | Lin | B60N 2/28 |
| 10,023,080 B2 * | 7/2018 | Lin | B60N 2/2887 |
| 2007/0170758 A1 * | 7/2007 | Allen | B60N 2/0244 297/250.1 |
| 2010/0057304 A1 * | 3/2010 | Kandler | B60N 2/002 701/47 |
| 2014/0084645 A1 * | 3/2014 | Heudorfer | B60R 21/2072 297/216.11 |
| 2015/0091348 A1 * | 4/2015 | Juchniewicz | B60N 2/2887 297/256.16 |
| 2018/0319365 A1 * | 11/2018 | Derieux | B60N 2/002 |

* cited by examiner

*Primary Examiner* — Mark R Wendell
(74) *Attorney, Agent, or Firm* — Wang Law Firm, Inc.

(57) ABSTRACT

An adjustment system for adjusting relative position between a car safety seat and an onboard backrest is introduced and has a controlling unit to receive a first monitoring signal or a second monitoring signal in response to pressure change, pull change or displacement. The adjustment system allows a backrest of the car safety seat to closely lean against the onboard backrest so that the child sitting on the car safety seat is well protected when in a sudden brake or a collision.

10 Claims, 13 Drawing Sheets

ADJUSTMENT SYSTEM AND METHOD THEREOF BETWEEN A CHILD CAR SAFETY SEAT AND A BACKREST

CROSS REFERENCE

This application is based upon PCT Patent Application No. PCT/CN2017/079694, filed on Apr. 7, 2017, for entering national stage, the entire contents of which are incorporated herein by reference.

BACKGROUND OF THE INVENTION

1. Field of the Invention

The preferred embodiment(s) as well as examples listed in the description is related to an adjustment system between a child car safety seat and a backrest and, as well as, an adjustment method between a child car safety seat and a backrest.

2. Description of the Related Art

Following the advance of the society, child/children taking a private-owned car is becoming inevitable, which sometimes results in the fact that the passenger, children onboard, becomes the collateral damage from a car accident. Passenger's, especially the child's onboard safety draws everybody's attention.

Child car safety seat is one type of restraining system onboard for children and has great effect in the prevention of injury of the children from a car accident. Most of the child car safety seat is an isolated accessory device in a car and can only restrain the child's body in the car and protect the child from injury due to drastic movement from a collision.

In normal driving situations, even without the protection of a safety car seat, children's safety may still be secured under the company of an adult. As a result, a large portion of car users might think since the opportunity of having a car accident is so small that the car safety seat may be neglected and even abandoned. How to promote the use of a car safety seat and advance its safety function becomes an urgent and important issue nowadays.

Other than the commercially available car safety seats, there are smart car safety seats provided and targeted in the promotion of functions. None of them target in the advance of safety issue. For example, Chinese patent application No. 2012102010511 discloses a child car safety seat, self-rescue system and method thereof. The child car safety seat is provided with a self-rescue device, a controller, an ID/sensing system and life support system. This application focuses only on the onboard life supporting system in the extreme situations. Another Chinese patent application No. 2013100276572 provides an integrated car seat height adjustment device and method, which is within the field of safety seat design aiming to reduce opportunity of onboard child injury. Still, another Chinese patent application No. 2012105382427, as well as No. 201410331191X, both of which target in the design of providing a novel way of positioning the car safety seat and clamping testing control. Currently, angle between the seat and backrest of a car safety seat is 90 degrees, which divides the seat and the backrest and leads to the result that when the brake is actuated or the car comes to a sudden stop, the inertia movement of the car requires safety strap or other auxiliary safety devices to help counteract the car movement.

SUMMARY OF THE INVENTION

The primary objective of the preferred embodiment of the present invention is to provide an adjustment system for adjusting relative position between a car safety seat and an onboard backrest, said car safety seat includes a car safety seat isofix device and a backrest, the adjustment system comprising:

a controlling unit for receiving a first monitoring signal in relation to the car safety seat isofix device or a second monitoring signal in relation to the backrest of the car safety seat and analyzing the first monitoring signal or the second monitoring signal to consequently generate an operation command;

a first driving unit in connection to the controlling unit to drive the car safety seat isofix device according to the operation command; or a second driving unit in connection to the controlling unit to drive the backrest to move according to the operation command.

Still another objective of the preferred embodiment of the present invention is that the first driving unit is an isofix motor to drive the car safety seat isofix device, the second driving unit is an angle adjuster motor which is provided to drive an angle adjuster mounted between the backrest of the car safety seat and a seat of the car safety seat thereof to control movement of the backrest of the car safety seat.

Still another objective of the preferred embodiment of the present invention is that the controlling unit monitors a current signal from the isofix motor to have the first monitoring signal; and the controlling unit monitors a current signal from the angle adjuster to have the second monitoring signal.

Still another objective of the preferred embodiment of the present invention is that the car safety seat isofix device includes an installation frame adapted to be connected to the car safety seat via a pushrod such that the pushrod is able to move the installation frame to move along the car safety seat;

the first driving unit adapted to be mounted on the car safety seat to move the pushrod.

Still another objective of the preferred embodiment of the present invention is comprising a pulling sensor mounted between the pushrod and the installation frame to monitor pull change between the pushrod and the installation frame so as to generate the first monitoring signal in response to the pull change;

a pressure sensor mounted on the backrest of the car safety seat to monitor pressure change on the backrest so as to generate the second monitoring signal in response to the pressure change.

Still another objective of the preferred embodiment of the present invention is that a displacement sensor mounted on the pushrod and having a sensing rod integrally formed with the displacement sensor to securely connect to the installation frame for monitoring displacement change of the installation frame so as to generate the first monitoring signal in response to the displacement change;

a pressure sensor mounted on the backrest of the car safety seat to monitor pressure change on the backrest so as to generate the second monitoring signal in response to the pressure change.

Still another objective of the preferred embodiment is that one end of the angle adjuster motor is mounted on the backrest of the car safety seat and the other end thereof is provided with a driving wheel which has a hole defined there through to securely receive therein extension of an axle integrally extended from the angle adjuster so that rotation of the driving wheel drives the angle adjuster to move.

Still another objective of the preferred embodiment of the present invention is that the controlling unit comprises:

a signal receiving module for receiving the first monitoring signal associated with the car safety seat isofix device or the second monitoring signal associated with the backrest;

a signal processing module connected to the signal receiving module to process signal so as to generate operation commands; and a signal output module connected to the signal processing module to output operation commands generated by the signal processing module.

Still another objective of the preferred embodiment of the present invention is that the controlling unit further has:

an information storage module connected to the signal processing module for recording the first monitoring signal or the second monitoring signal respectively corresponding to the car safety seat isofix device or the backrest; and a radio communication module connected to the information storage module for transmitting the first monitoring signal or the second monitoring signal recorded in the information storage module, the radio communication module being connected to an onboard computer or cloud.

Another objective of the preferred embodiment of the present invention is to provide a method for adjusting relative position between a car safety seat and an onboard backrest, the method comprising the steps of:

providing a car safety seat controlling unit for receiving a first monitoring signal in relation to an isofix device of the car safety seat or a second monitoring signal in relation to a backrest and analyzing the received data to generate an operation command;

providing a first driving unit to drive an isofix device of the car safety seat according to the operation command; or providing a second driving unit to drive an angle adjuster mounted on the car safety seat according to the operation command to move a backrest of the car safety seat relative to the onboard backrest.

DETAILED DESCRIPTION OF THE PREFERRED EMBODIMENT

Figure 1:
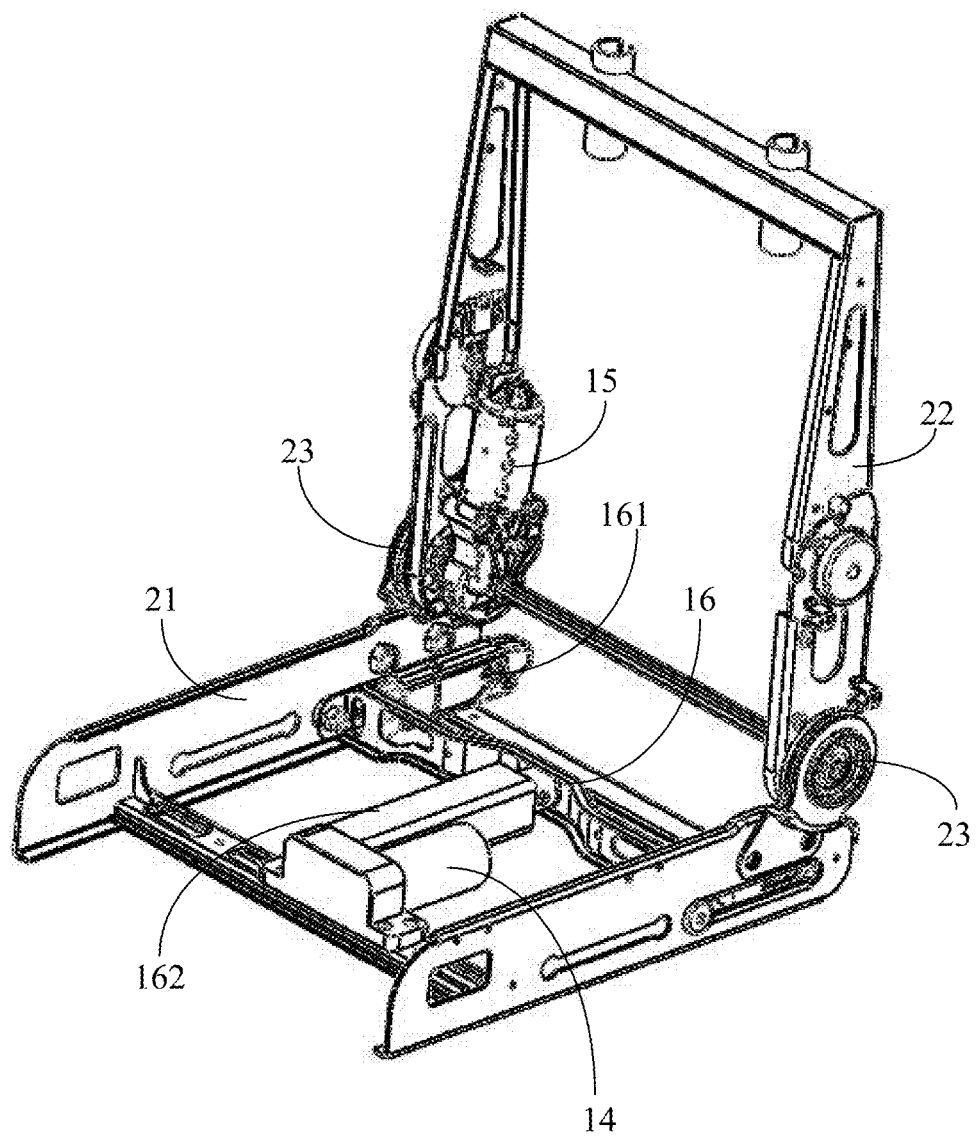
FIG. 1 is a schematic view showing the relationship between the seat and the backrest of a child safety seat of the preferred embodiment of the present invention.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral. It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept. The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

The following description describes different preferred embodiments of how the adjustment system and method thereof between a child car safety seat and a backrest so that the status gathering module on the child car safety seat is able to pick up the child status on a child car safety seat and environment situations inside the car as well as the child's vital characteristics and proceed analysis to remind of the driver or the parent(s) of how the child feels. When necessary, the information picked up is sent to the onboard computer to adjust the onboard environment.

The following disclosure incorporated with the accompanying drawings discusses further about the preferred embodiment of the present invention.

Figure 2:
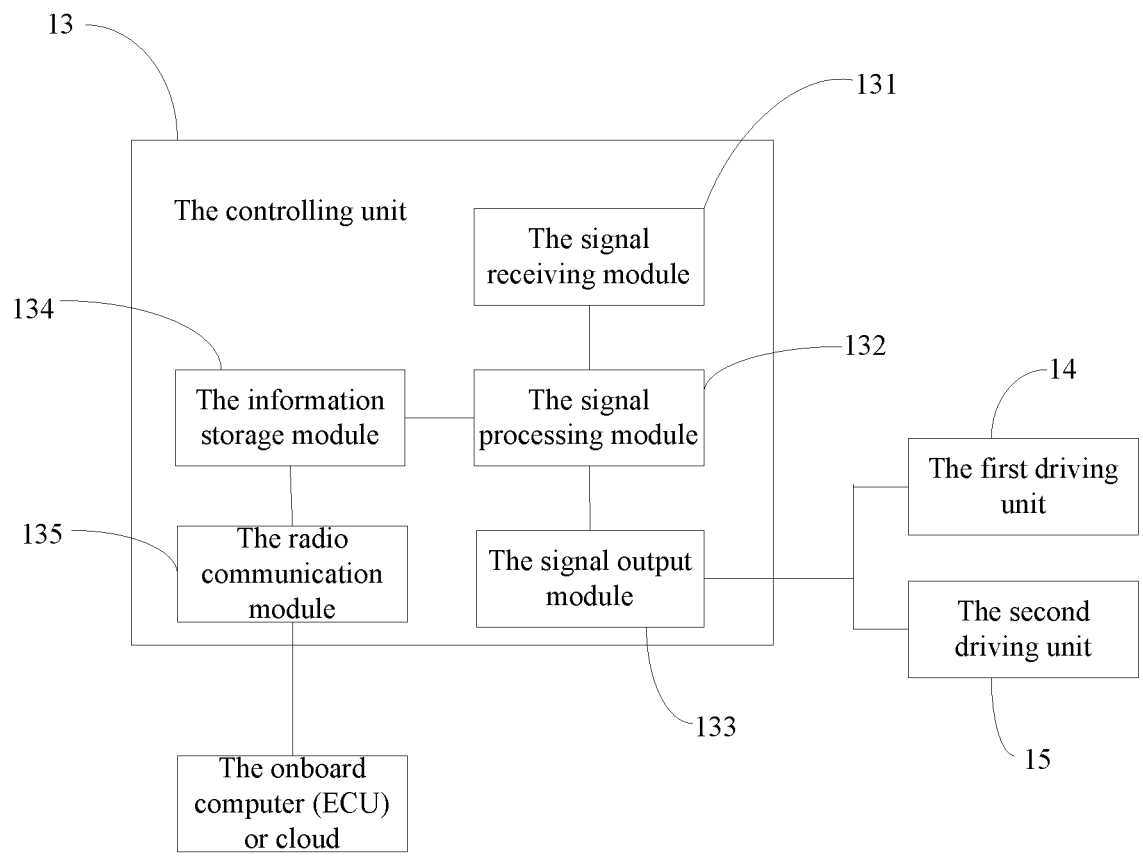
FIG. 2 is a schematic functional blocks of the system of the child safety seat of the preferred embodiment of the present invention.
Figure 3:
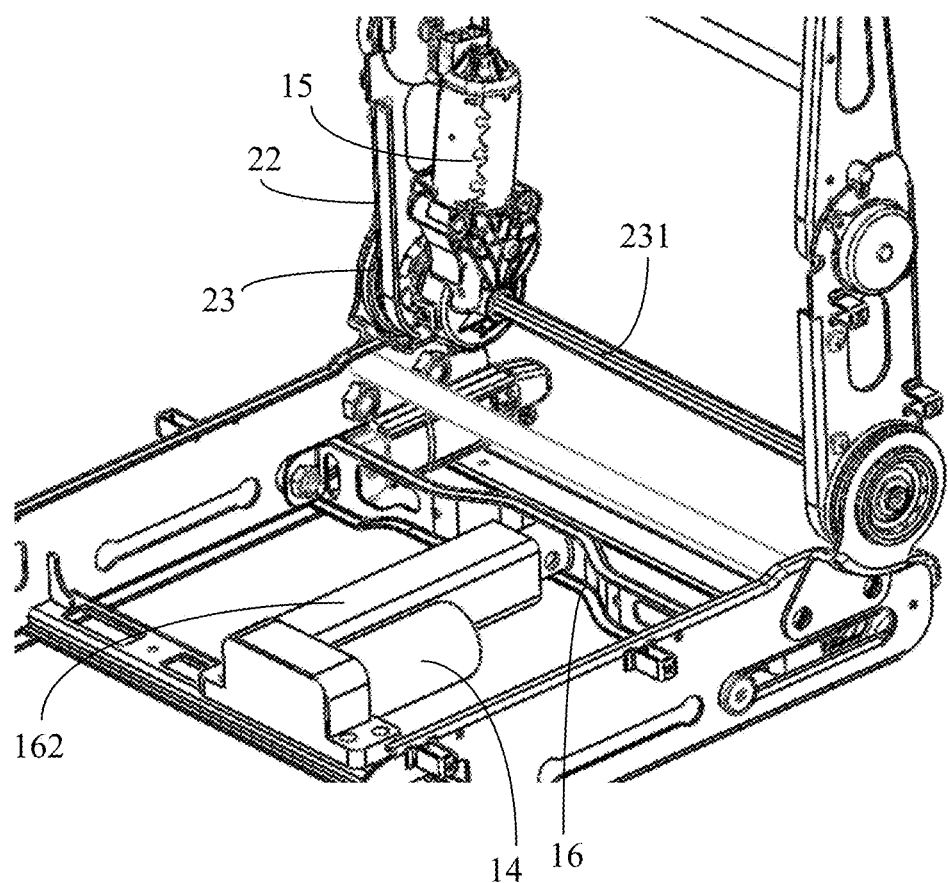
FIG. 3 is a partially enlarged perspective view of the system of the child safety seat of the preferred embodiment of the present invention.

First of all, with reference to FIGS. 1~3, the adjustment system of the child car safety seat includes a controlling unit 13, a first driving unit 14 and a second driving unit 15 both of which are respectively connected to the controlling unit 13.

ISOFIX stands for international standards organization FIX and is an organization concerning standards for child car seat. ISOFIX focuses on fast and easy connection between the child car seat and the car aiming to reach the goal of any ISOFIX approved child car seat would be able to readily and fast connect to the car to enhance safety.

According to the above goal, the adjustment system of the preferred embodiment of the present invention further includes an installation frame 16 and an isofix connection 161 mounted on top of the installation frame 16. The installation frame 16 is slidably mounted on a seat frame 21 via the assistance of a pushrod 162 which may be a mechanical gear unit or a hydraulic cylinder. The isofix connection 161 is securely connected to a corresponding onboard connection.

The first driving unit 14 adopts isofix motor and is mounted to drive the pushrod 162 such that the movement of the pushrod 162 is able to drive the installation frame 16 along with the isofix connection 161 to move forward or backward in regard to the seat frame 21, as shown in FIGS. 1 and 3.

Figure 4:
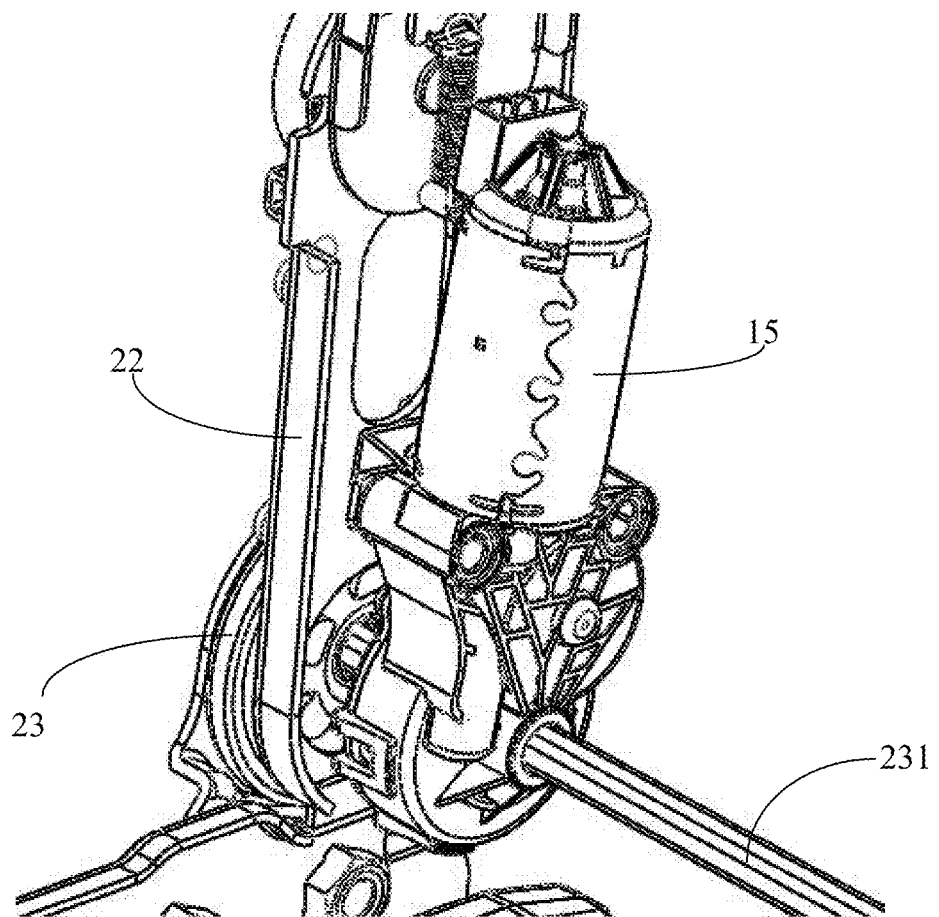
FIG. 4 is a perspective view showing relationship between the second driving unit and the angle adjuster.
Figure 5:
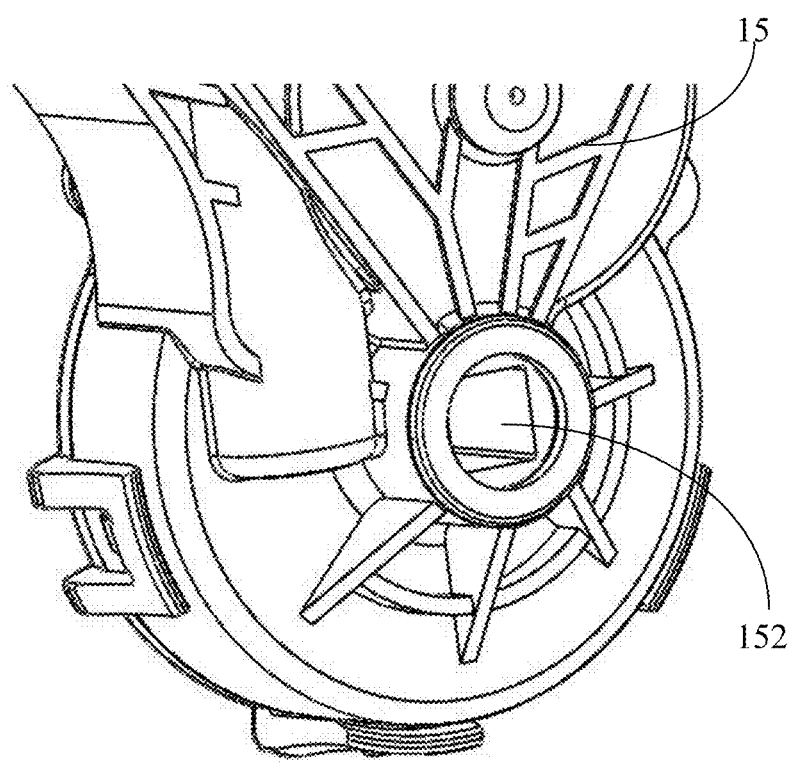
FIG. 5 is a perspective view of the angle adjuster of the preferred embodiment of the present invention.

With reference to FIGS. 4 and 5, the second driving unit 15 is provided to drive an angle adjuster 23 mounted at a joint between a backrest and a seat of the child car seat so that angle between the backrest and the seat is changeable. The angle adjuster 23 has a first end securely mounted on the backrest 22 and a second end provided with a hole 152 dimensioned and shaped to securely receive therein an axle 231 extending out from the hole 152. In this embodiment, the hole 152 and the axle 231 are both square in cross section. Thus, when the axle 231 is driven to rotate, the backrest 22 is able to change angle relative to the seat frame 21.

It is noted that the angle adjuster is mounted on the car safety seat to fulfill the angle adjustment of the backrest. The device normally is composed of a backrest connection plate, a seat connection plate, core elements, a handle or an adjusting handle and recoil springs. In some low-cost car safety seat, the backrest connection plate and the seat connection plate are integrated into the backrest frame and the seat frame. The angle adjustment may be divided into two categories, level adjustment and stepless adjustment.

The controlling unit 13 (Electronic Control Unit, ECU) monitors signals from the isofix motor to have the first monitoring signal and signals from the angle adjuster to have the second monitoring signal.

After receiving the first monitoring signal and the second monitoring signal, the controlling unit 13 processes the received signals according predetermined protocol to generate operation commands.

The first driving unit 14 is electrically connected to the controlling unit 13 to control the isofix device to operate according to the operation commands from the controlling unit 13.

The second driving unit 15 is electrically connected to the controlling unit 13 to control the backrest 22 to operate according to the operation commands from the controlling unit 13.

Further, the controlling unit 13 of the system of the preferred embodiment of the present invention is composed of the following modules, which includes:

a signal receiving module 131 for receiving the first monitoring signal associated with isofix device and the second monitoring signal associated with the backrest;

a signal processing module 132 connected to the signal receiving module 131 to process signal so as to generate operation commands;

a signal output module 133 connected to the signal processing module 132 to output operation commands generated by the signal processing module 132;

an information storage module 134 connected to the signal processing module 132 for recording the first monitoring signal and the second monitoring signal respectively corresponding to the isofix device and the backrest when reaching a specific position; and a radio communication module 135 connected to the information storage module 134 for transmitting the first monitoring signal and the second monitoring signal recorded in the information storage module 134.

In which, the radio communication module 135 is connected to the onboard computer (ECU) or cloud via internet such that the radio communication module 135 is able to transmit signals to wherever appropriate through WIFI, ZIGBEE, GPRS or others.

The controlling unit further has an alarm module (not shown). The alarm module is connected to the signal processing module 132 to check if parameters contained in the first monitoring signal or the second monitoring signal exceed predetermined range and sends out warning message when exceeded. An alarm (honk or warning light or the like) may be mounted on the car safety seat to respond to the warning message and call for assistance from the experts. Alternatively, the alarm module is connected to the radio communication module such that the radio communication module is able to send out the warning message from the alarm module along with parameters recorded in the information storage module to the onboard computer or cloud.

The following embodiments present the fulfillment of the adjustment system of the present invention, which is installed in the car safety seat between the isofix seat and the backrest.

Embodiment 1

The isofix motor is activated to drive the pushrod of the isofix motor to push the isofix device to any desired position. After the isofix motor is activated and an electrical current signal is thus generated and so as the first monitoring signal. The controlling unit (ECU) of the car safety seat activates the angle adjuster after receiving the first monitoring signal to drive the backrest. When the backrest of the car safety seat is closely next to the onboard backrest, the motor of the angle adjuster occurs locked-rotor current which is larger than working current of the angle adjuster motor. ECU may detect existence of the locked-rotor current to judge the location of the backrest of the car safety seat.

Similarly, the angle adjuster motor is activated and the backrest of the car safety seat is consequently rotated relative to the seat of the car safety seat. In the meantime, the current from the angle adjuster motor generates the second monitoring signal which is sent out to the controlling unit. After the controlling unit (ECU) of the car safety seat receives the second monitoring signal, the isofix motor is activated to adjust the pushrod's extension length. When the backrest of the car safety seat is closely against the onboard backrest, the motor of the angle adjuster occurs locked-rotor current, which is larger than working current of the angle adjuster motor. ECU may detect existence of the locked-rotor current to determine whether the extension length of the pushrod reaches the required length.

With reference to FIGS. 6-11, a pulling sensor is provided and is connected to the pushrod. The pulling sensor 110 mounted between the installation frame and the pushrod is to monitor pulling variations between the pushrod and the installation frame in real time so as to generate the first monitoring signal.

A pressure sensor 120 is provided and mounted on the backrest of the car safety seat to monitor pressure changes from the backrest of the car safety seat to the onboard backrest to thus generate the second monitoring signal.

Figure 12:
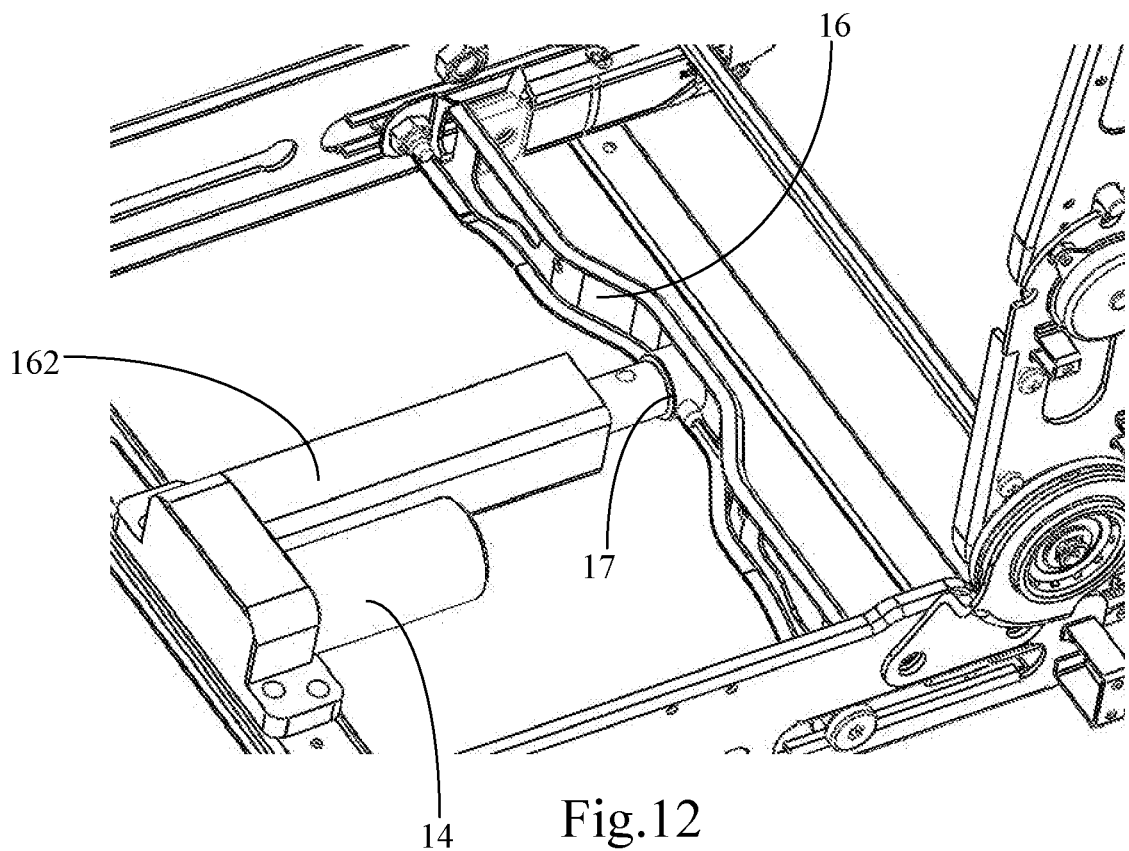
FIG. 12 is a partial perspective view showing the mounting of the pulling sensor of the preferred embodiment of the present invention.
Figure 13:
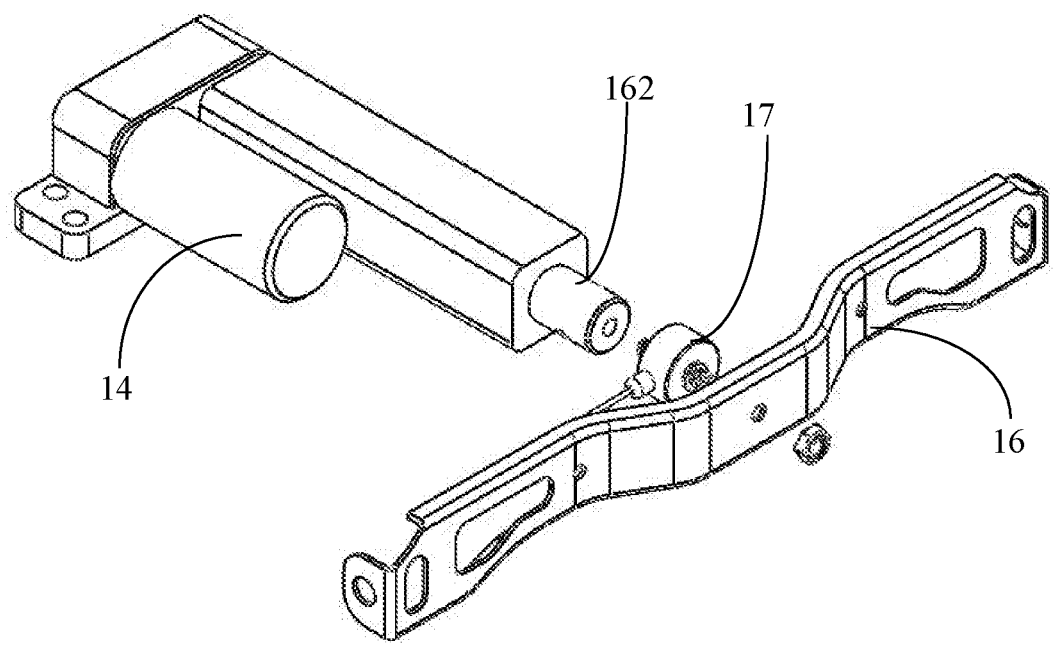
FIG. 13 is an exploded perspective view of the pulling sensor of the preferred embodiment of the present invention.

With reference to FIGS. 12 and 13, the pulling sensor 17 is mounted between the pushrod 162 and the installation frame 16 and has studs integrally formed on two distal ends thereof to correspond to two threaded bores respectively defined in the pushrod 162 and the installation frame 16 so that the pulling sensor is able to be securely mounted between the pushrod and the installation frame.

Figure 6:
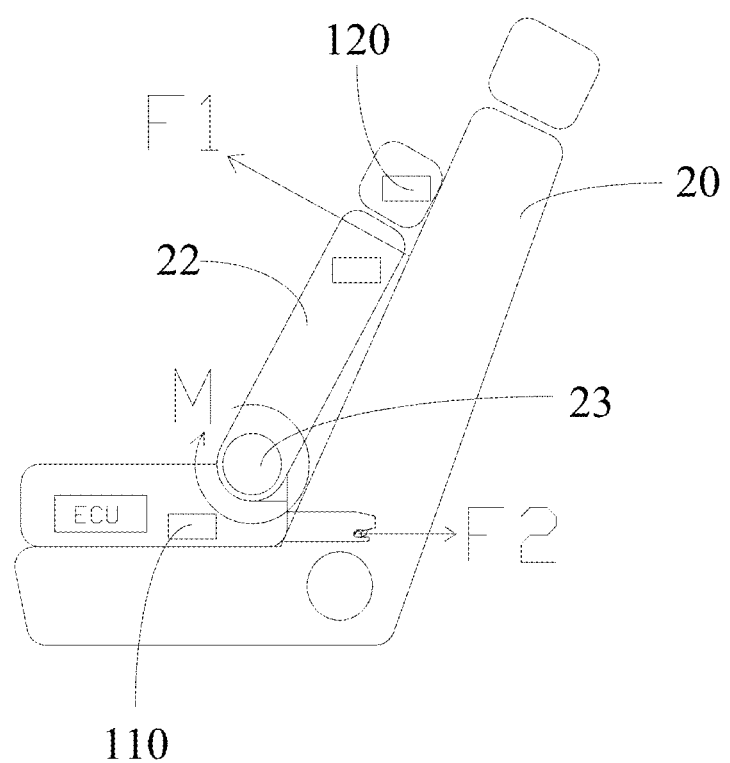
FIG. 6~8 are schematic views showing the movement of the backrest due to the function of the angle adjuster of the preferred embodiment of the present invention.
Figure 7:
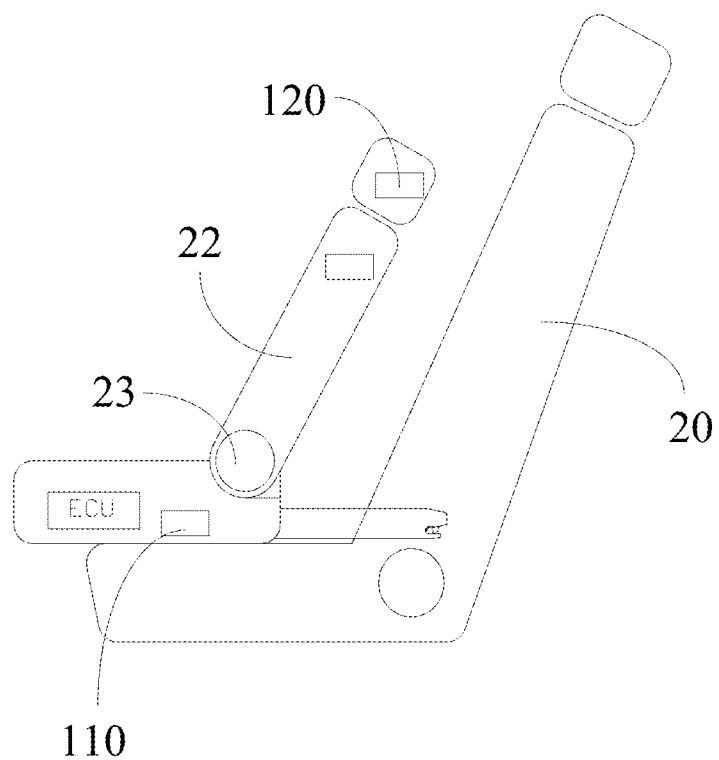
Figure 8:
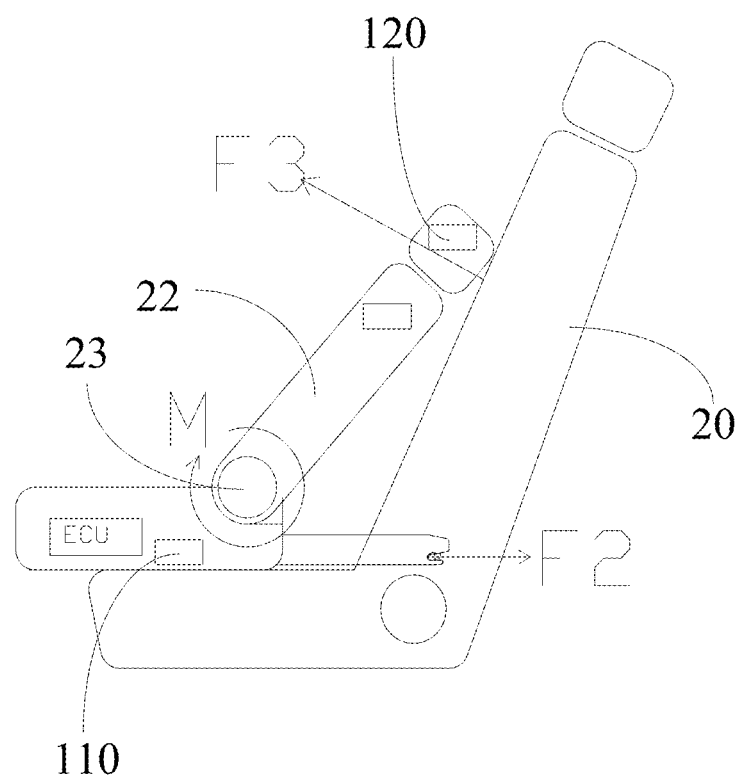

With reference to FIGS. 6-8, the pushrod is activated to place the installation frame at a random position, as shown in FIGS. 6 and 7. Due to the movement of the installation frame, the pulling sensor 110 is activated and the first monitoring signal is thus generated. After the ECU receives the first monitoring signal, the angle adjuster 23 is then operated accordingly to adjust the backrest 22 of the car safety seat to move toward the onboard backrest 20. When the backrest 22 of the car safety seat is leaning closely against the onboard backrest 22, the pressure sensor 120 mounted on the backrest 22 of the car safety seat senses the pressure change between the backrest 22 of the car safety seat and the onboard backrest 20, the second monitoring signal is generated and transmitted. ECU receives the second monitoring signal from the pressure sensor 120 and verifies the actual position of the backrest 22 of the car safety seat accordingly. After the position of the backrest of the car safety seat reaches the predetermined position, the ECU sends out a command to stop movement of the angle adjuster 23, as shown in FIG. 8, to complete adjustment of the backrest 22 by the isofix device.

Figure 9:
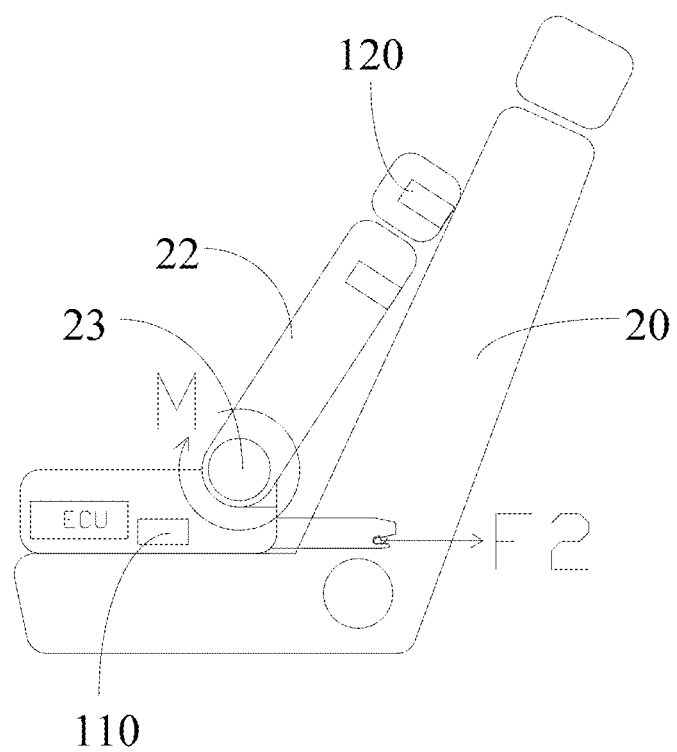
FIGS. 9~11 are schematic views showing movement of the backrest due to the function of the angle adjuster of the preferred embodiment of the present invention in a different perspective.
Figure 10:
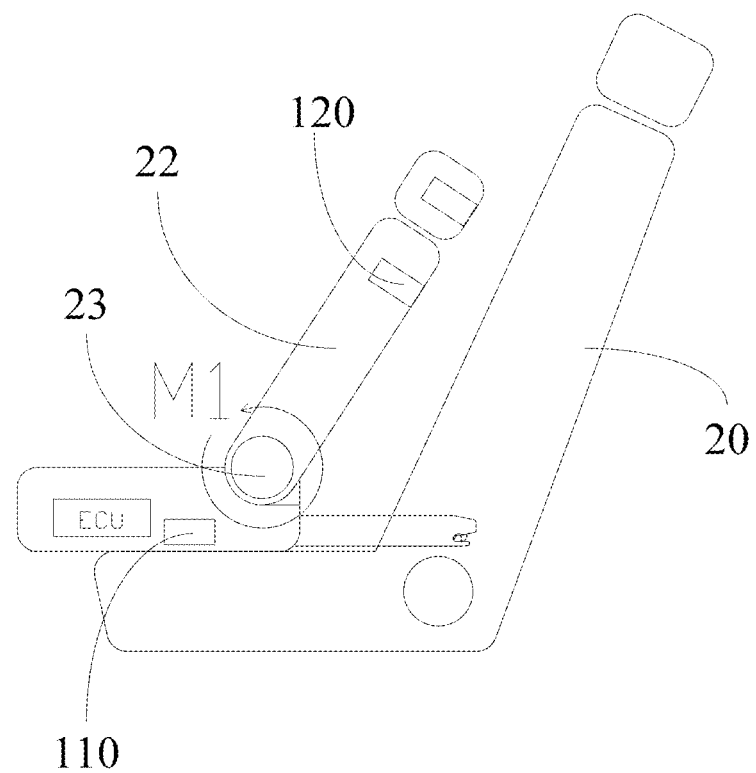
Figure 11:
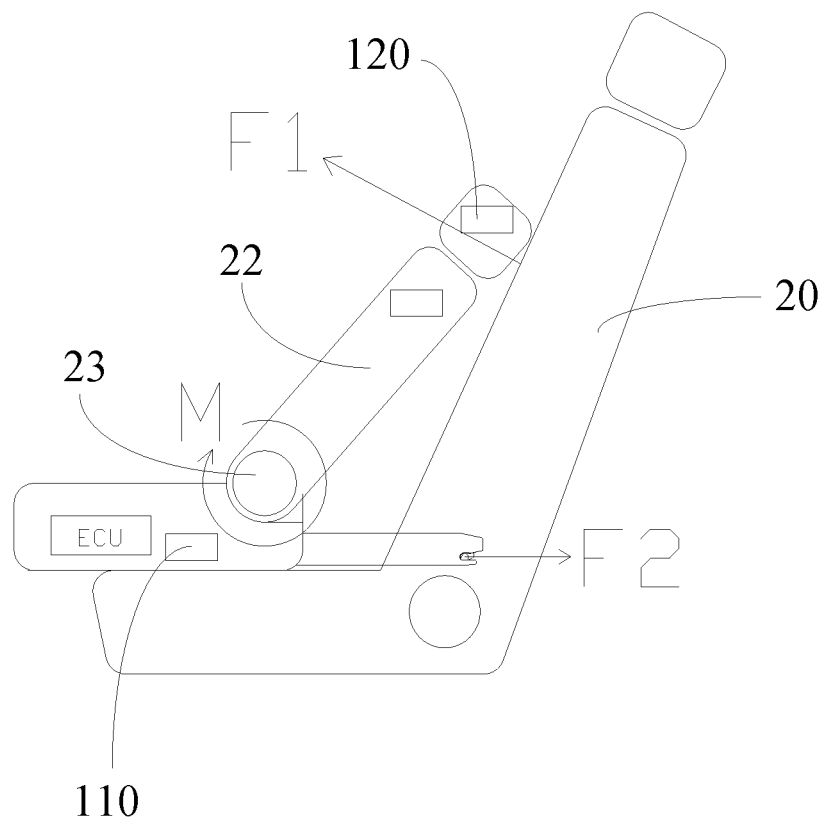

With reference to FIGS. 9-11, the angle adjuster is activated, as shown in FIGS. 9-10. The movement of the angle adjuster triggers the transmission of the second monitoring signal from the pressure sensor 120. The controlling element (ECU) of the car safety seat receives the second monitoring signal and then activates the isofix motor to operate the pushrod of the isofix device. While the pushrod extends, the backrest 22 gradually leans against the onboard backrest 20. Due to the engagement between the two backrests, the pulling sensor 110 detects the pulling force between the pushrod and the installation frame and then sends out the first monitoring signal. The ECU receives the first monitoring signal to judge, according to the raw data contained in the first monitoring signal, whether the pushrod reaches the predetermined length, and then sends out a command to stop operation of the pushrod should the data examined qualify previously determined criteria, as shown in FIG. 11.

In a preferred embodiment, it is also possible to connect the isofix motor to the ECU (the controlling element of the car safety seat) to use the current signal from the isofix motor to activate the ECU. The activation of the ECU automatically operates the movement of the angle adjuster to proceed angle adjustment to the backrest of the car safety seat. Similarly, it is possible to electrically connect the angle adjuster motor to the ECU so that the current signal from the angle adjuster motor activates the ECU. Consequently, the isofix motor is operated by the ECU to proceed the following adjustment. The pressure sensor may be mounted on the onboard backrest at a location where the backrest of the car safety seat definitely contacts with.

Embodiment 2

With reference to FIGS. 6-11, a pulling sensor is provided and is connected to the pushrod. The pulling sensor 110 mounted between the installation frame and the pushrod is to monitor pulling variations between the pushrod and the installation frame in real time so as to generate the first monitoring signal.

A pressure sensor 120 is provided and mounted on the backrest of the car safety seat to monitor pressure changes from the backrest of the car safety seat to the onboard backrest to thus generate the second monitoring signal.

With reference to FIGS. 12 and 13, the pulling sensor 17 is mounted between the pushrod 162 and the installation frame 16 and has studs integrally formed on two distal ends thereof to correspond to two threaded bores respectively defined in the pushrod 162 and the installation frame 16 so that the pulling sensor is able to be securely mounted between the pushrod and the installation frame.

With reference to FIGS. 6-8, the pushrod is activated to place the installation frame at a random position, as shown in FIGS. 6 and 7. Due to the movement of the installation frame, the pulling sensor 110 is activated and the first monitoring signal is thus generated. After the ECU receives the first monitoring signal, the angle adjuster 23 is then operated accordingly to adjust the backrest 22 of the car safety seat to move toward the onboard backrest 20. When the backrest 22 of the car safety seat is leaning closely against the onboard backrest 22, the pressure sensor 120 mounted on the backrest 22 of the car safety seat senses the pressure change between the backrest 22 of the car safety seat and the onboard backrest 20, the second monitoring signal is generated and transmitted. ECU receives the second monitoring signal from the pressure sensor 120 and verifies the actual position of the backrest 22 of the car safety seat accordingly. After the position of the backrest of the car safety seat reaches the predetermined position, the ECU sends out a command to stop movement of the angle adjuster 23, as shown in FIG. 8, to complete adjustment of the backrest 22 by the isofix device.

With reference to FIGS. 9-11, the angle adjuster is activated, as shown in FIGS. 9-10. The movement of the angle adjuster triggers the transmission of the second monitoring signal from the pressure sensor 120. The controlling element (ECU) of the car safety seat receives the second monitoring signal and then activates the isofix motor to operate the pushrod of the isofix device. While the pushrod extends, the backrest 22 gradually leans against the onboard backrest 20. Due to the engagement between the two backrests, the pulling sensor 110 detects the pulling force between the pushrod and the installation frame and then sends out the first monitoring signal. The ECU receives the first monitoring signal to judge, according to the raw data contained in the first monitoring signal, whether the pushrod reaches the predetermined length, and then sends out a command to stop operation of the pushrod should the data examined qualify previously determined criteria, as shown in FIG. 11.

In a preferred embodiment, it is also possible to connect the isofix motor to the ECU (the controlling element of the car safety seat) to use the current signal from the isofix motor to activate the ECU. The activation of the ECU automatically operates the movement of the angle adjuster to proceed angle adjustment to the backrest of the car safety seat. Similarly, it is possible to electrically connect the angle adjuster motor to the ECU so that the current signal from the angle adjuster motor activates the ECU. Consequently, the isofix motor is operated by the ECU to proceed the following adjustment. The pressure sensor may be mounted on the onboard backrest at a location where the backrest of the car safety seat definitely contacts with.

Embodiment 3

A displacement sensor 18 is provided and located on the pushrod 162 of the isofix device. The displacement sensor 18 has a sensing rod 181 connected to the installation frame 16 to monitor displacement of the installation so as to generate a first monitoring signal. A pressure sensor is provided and mounted on the backrest of the car safety seat to monitor pressure change from the backrest of the car safety seat so as to generate a second monitoring signal.

Figure 14:
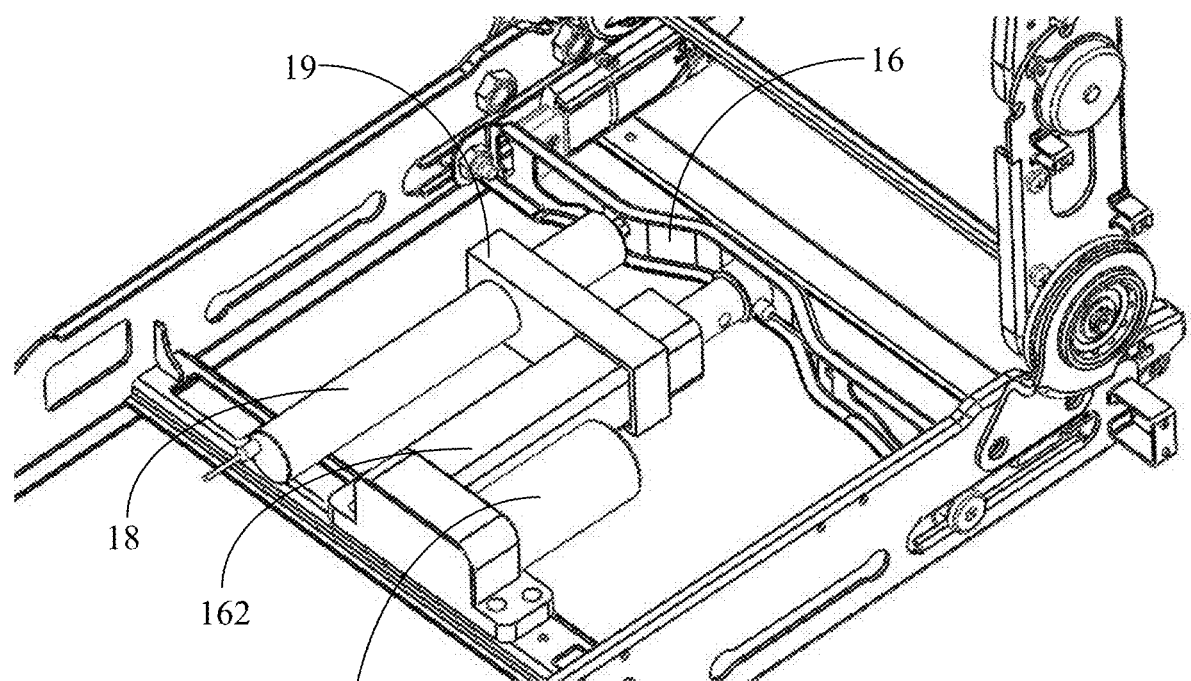
FIG. 14 is a partial perspective view showing the mounting of the displacement sensor of the preferred embodiment of the present invention.
Figure 15:
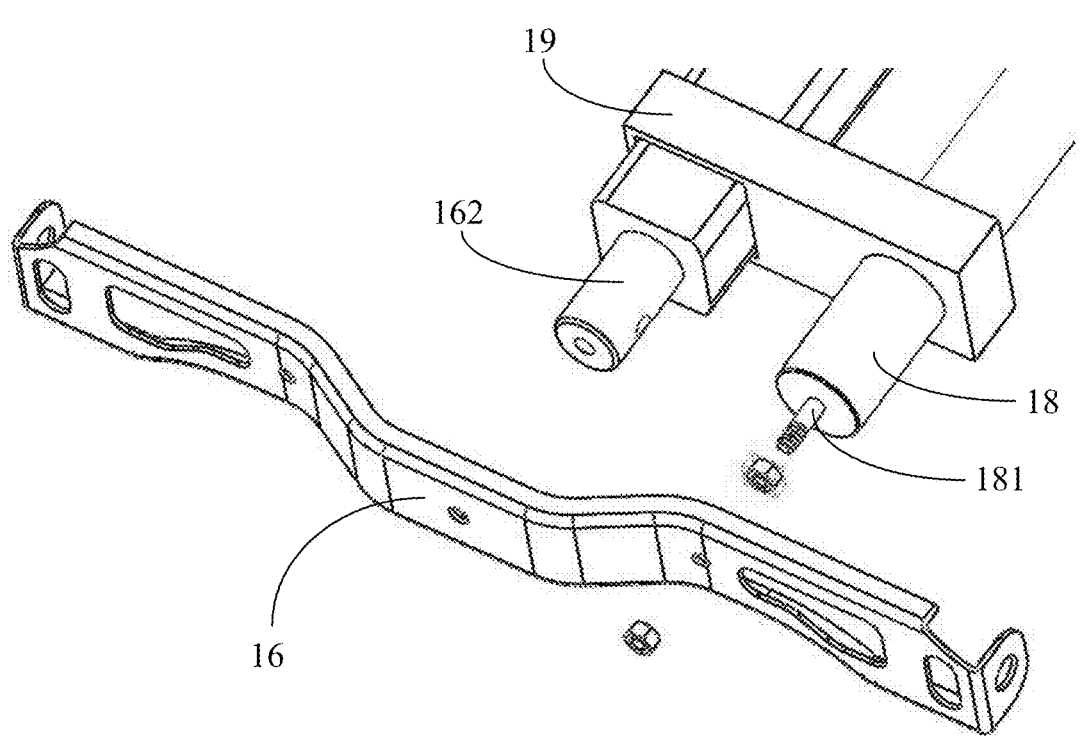
FIG. 15 is an exploded perspective view of the displacement sensor of the preferred embodiment of the present invention.

With reference to FIGS. 14 and 15, the displacement sensor 18 is mounted on the pushrod 162 via a positioning block 19. One distal end of the pushrod 162 is mounted on the seat frame and the other distal end of the pushrod 162 is telescopically connected to the installation frame 16. The positioning block 19, the pushrod 162 and the displacement sensor 18 are respectively interference fitted. The sensing rod 181 of the displacement sensor 18 has a threaded end and the installation frame 16 has a threaded hole such that extension of the threaded end into the threaded hole of the installation frame secures the connection of the sensing rod 181 to the installation frame 16.

When the pushrod 162 is pushes, the installation frame 16 is moved to a random position, which activates the displacement sensor 18 to generate the first monitoring signal. When the ECU receives the first monitoring signal, the ECU automatically activates the angle adjuster to move the backrest of the car safety seat toward the onboard backrest. After the backrest of the car safety seat gradually leans closely against the onboard backrest, the ECU may determine whether the backrest of the car safety seat reaches the predetermined position according to the data read from the pressure sensor.

The angle adjuster is activated and the isofix motor is activated by the ECU to adjust the extension length of the pushrod. When the backrest of the car safety seat is closely connected to the onboard backrest, the ECU may determine whether the pushrod reaches the previously determined position via the data from the displacement sensor sensing the displacement of the installation frame.

In this embodiment, it is also possible to electrically connect the isofix motor to the controlling unit (ECU) of the car safety seat so that the current signal from the activation of the isofix motor triggers the ECU. The ECU activates the angle adjuster to proceed adjustment of the backrest of the car safety seat. Similarly, the angle adjuster may be electrically connected to the ECU such that the current signal from the activation of the angle adjuster motor triggers the ECU. The ECU activates the isofix device to proceed the adjustment. The pressure sensor in this embodiment may be mounted on the onboard backrest at a location where the backrest of the car safety seat is definitely in contact with.

This application involves the car safety seat adjustment, especially to the related adjustments of the angle of the backrest or the extension of the isofix device of the car safety seat to ensure the close engagement between the backrest of the car safety seat and the onboard backrest. By way of reading the value from the angle adjuster to determine the position of the backrest of the car safety seat or the readings from the pressure sensor to determine whether the backrest of the car safety seat engages with the onboard backrest or not or from the information transmitted from the pulling sensor, the ECU then provide the best support to the child sitting on the car safety seat via positioning the backrest of the backrest of the car safety seat. The ECU analyzes the data and then transmits the data to onboard computer, cloud, mobile terminal of emergency response center to ensure that the child sitting on the car safety seat is well protected when encountering brake, sudden brake or accidents of any kind. The data received can be used to control the activation of the air-bags all around the car or the explosion range of the air bag on the car safety seat. In emergency situations, the data can also be used to control the position of the front seat or the back seat or even the car windows.

The extension of the isofix device can be measured by electrical isofix. While adjusting the backrest of the car safety seat to any position via electrical isofix along with the angle adjuster, the backrest of the car safety seat or the angle adjuster can also be rigidly mounted on the onboard seat (the backrest of the car safety seat along with the isofix as well as the onboard car seat can be securely connected and the current signal from the motor of the isofix pushrod can be used to determine whether the connection is appropriate and the extension of the pushrod and the angle of the backrest of the car safety seat satisfies the predetermined criteria such that when encountering an impact, the deformation of the onboard car seat as well as the car safety seat is reduced and the child sitting on the car safety seat is protected.

From the embodiment, it is appreciated that the adjustment system of the car safety seat is described in detail and the method to achieve the designed purpose comprises the steps of:

S001: providing a car safety seat controlling unit for receiving a first monitoring signal from an isofix device or a second monitoring signal from a backrest and analyzing the received data to generate an operation command;

S002: providing a first driving unit to drive the isofix device according to the operation command; or S003: providing a second driving unit to drive an angle adjuster mounted on a car safety seat to move a backrest of the car safety seat relative to the onboard backrest.

It is appreciated that the structure, scale, size . . . etc. provided in the detailed description as well as in the accompanying drawings are all for explanatory purpose to allow people skilled in the art to read and understand the operation contained therein and do not intend to limit the embodiment(s) in any way. Any alternation, amendment or modification to the structure, scale or size to the embodiment shown above shall still fall within the protection scope sought and defined in the following claim set should any alternation, amendment or modification to the structure, scale or size to the preferred embodiment of the present invention not affect the function as well as the purpose set forth. Meanwhile, the "up", "down", "left", "right", "middle" and "a" are all used for explanatory purpose and do not intend to limit the embodiment(s) in any way. Any alternation, amendment or modification to the above shall still fall within the protection scope sought and defined in the following claim set.

What is claimed is:

1. An adjustment system for adjusting relative position between a car safety seat and an onboard backrest, said car safety seat including a car safety seat isofix device and a backrest, wherein the adjustment system comprising:

a controlling unit for selectively receiving a first monitoring signal in relation to the car safety seat isofix device and a second monitoring signal in relation to a relative angle between the backrest of the car safety seat and the onboard backrest and consequently analyzing the first monitoring signal and the second monitoring signal to generate an operation command;

a first driving unit in connection to the controlling unit to drive the car safety seat isofix device according to the operation command; and a second driving unit in connection to the controlling unit to drive the backrest to move according to the operation command;

the car safety seat isofix device includes an installation frame adapted to be connected to the car safety seat via a pushrod such that the pushrod is able to move the installation frame to move along the car safety seat;

the first driving unit adapted to be mounted on the car safety seat to move the pushrod.

2. The adjustment system as claimed in claim 1, wherein the first driving unit is an isofix motor to drive the car safety seat isofix device, the second driving unit is an angle adjuster motor which is provided to drive an angle adjuster mounted between the backrest of the car safety seat device and a seat of the car safety seat to control movement of the backrest of the car safety seat.

3. The adjustment system as claimed in claim 2, wherein the controlling unit monitors a current signal from the isofix motor to generate the first monitoring signal; and the controlling unit monitors a current signal from the angle adjuster to generate the second monitoring signal.

4. The adjustment system as claimed in claim 2, wherein one end of the angle adjuster motor is mounted on the backrest of the car safety seat and the other end thereof is provided with a driving wheel which has a hole defined there through to securely receive therein extension of an axle integrally extended from the angle adjuster so that rotation of the driving wheel drives the angle adjuster to move.

5. The adjustment system as claimed in claim 1 further comprising a pulling sensor mounted between the pushrod and the installation frame to monitor pull change between the pushrod and the installation frame so as to generate the first monitoring signal in response to the pull change;

a pressure sensor mounted on the backrest of the car safety seat to monitor pressure change on the backrest so as to generate the second monitoring signal in response to the pressure change.

6. The adjustment system as claimed in claim 1 further comprising:

a displacement sensor mounted on the pushrod and having a sensing rod integrally formed with the displacement sensor to securely connect to the installation frame for monitoring displacement change of the installation frame so as to generate the first monitoring signal in response to the displacement change;

a pressure sensor mounted on the backrest of the car safety seat to monitor pressure change on the backrest so as to generate the second monitoring signal in response to the pressure change.

7. The adjustment system as claimed in claim 1, wherein the controlling unit comprises:

a signal receiving module for receiving the first monitoring signal associated with the car safety seat isofix device or the second monitoring signal associated with the backrest;

a signal processing module connected to the signal receiving module to process signal so as to generate operation commands; and a signal output module connected to the signal processing module to output operation commands generated by the signal processing module.

8. The adjustment system as claimed in claim 7, wherein the controlling unit further has:

an information storage module connected to the signal processing module for recording the first monitoring signal or the second monitoring signal respectively corresponding to the car safety seat isofix device or the backrest; and a radio communication module connected to the information storage module for transmitting the first monitoring signal or the second monitoring signal recorded in the information storage module, the radio communication module being connected to an onboard computer or cloud.

9. An adjustment system for adjusting relative position between a car safety seat and an onboard backrest, said car safety seat including a car safety seat isofix device and a backrest, wherein the adjustment system comprises:

a controlling unit for selectively receiving a first monitoring signal in relation to the car safety seat isofix device and a second monitoring signal in relation to a relative angle between the backrest of the car safety seat and the onboard backrest and to generate an operation command in regard to the first monitor signal and the second monitor signal accordingly; wherein the car safety seat isofix device includes an installation frame adapted to be connected to the car safety seat via a pushrod such that the pushrod is able to move the installation frame to move along the car safety seat; and an operation driving unit in connection to the controlling unit to drive the car safety seat isofix device according to the operation command and being adapted to be mounted on the car safety seat to move the pushrod.

10. An adjustment system for adjusting relative position between a car safety seat and an onboard backrest, said car safety seat including a car safety seat isofix device and a backrest, wherein the adjustment system comprising:

a controlling unit for selectively receiving a first monitoring signal in relation to the car safety seat isofix device and a second monitoring signal in relation to a relative angle between the backrest of the car safety seat and the onboard backrest to generate an operation command in regard to the first monitor signal and the second monitor signal accordingly; wherein the car safety seat isofix device includes an installation frame adapted to be connected to the car safety seat via a movable pushrod such that the pushrod is able to move the installation frame to move along the car safety seat; and an angle driving unit in connection to the controlling unit to drive the backrest to change angle relative to the onboard backrest according to the operation command.

* * * * *